Figure 1A:
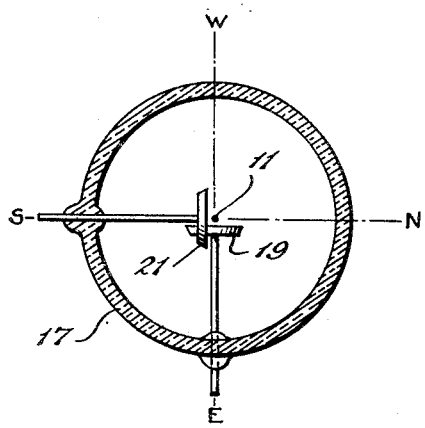

May 15, 1951     A. L. RAWLINGS     2,552,650
VIBRATORY STABLE REFERENCE APPARATUS

Filed Aug. 2, 1946     2 Sheets-Sheet 1

INVENTOR
ARTHUR L. RAWLINGS
BY
Herbert P. Thompson
his ATTORNEY

Patented May 15, 1951

2,552,650

UNITED STATES PATENT OFFICE 2,552,650

VIBRATORY STABLE REFERENCE APPARATUS

Arthur L. Rawlings, New York, N. Y., assignor to The Sperry Corporation, a corporation of Delaware Application August 2, 1946, Serial No. 688,160

13 Claims. (Cl. 318—489)

The present invention relates to stable reference apparatus, and more particularly, to vibratory apparatus for establishing a stable orientation reference about a predetermined axis in space.

As set forth in U. S. Patent application, Serial No. 556,186, filed September 28, 1944, now Patent No. 2,542,018, by T. M. Ferrill, Jr., there has heretofore been provided a stable reference system employing a relatively fine-gauge strand of elastic material stretched between two points in an evacuated supporting structure, the strand being energized by the passage therethrough of alternating current at the resonant frequency thereof to produce vibration of the strand at right angles to a surrounding or encompassing magnetic field. Capacitor pick-off elements energized by a direct voltage source have been provided in this apparatus for producing alternating voltages corresponding to the mutually perpendicular components of vibration of the strand. These perpendicular component voltages have been applied to quadrature component-resolving directional indicator apparatus such as either a "Telegon" or a cathode ray oscilloscope, employed for continuously indicating the direction of vibration of the strand relative to a craft upon which it is installed.

In the above-mentioned patent application, the vibratory stable reference system was employed as a self-stabilized magnetic compass for aircraft. The supporting structure and pick-off elements of this system were arranged to be fixed to the craft with the strand standing normally vertical. The directional indicator apparatus similarly was fixed to the craft, and was provided with a 360° directional scale calibrated in the plan of a compass rose. The earth's magnetic field was the ambient field reacting with current through the strand to provide motive power therefor, so that the strand was urged to vibrate in the vertical east-west plane; i. e., the plane perpendicular to the horizontal component of the earth's magnetic field.

When vibration of the strand in a selected plane has been established, it continues to vibrate in this plane, and appears to be uninfluenced by short-duration forces so directed as to cause a change of space-orientation of the plane of vibration. Because of this fact, the vibratory element exhibits stability characteristics useful for the purposes for which gyroscopes with massive, high-speed rotors have heretofore been employed. For achieving persistent stability of the plane of vibration of the vibratory element, it has heretofore been necessary that the vibratory element should have substantially equal vibratory characteristics in all planes which contain it. A cantilever-supported vibratory metallic rod of generally circular cross-section, similarly useful as a stable orientation reference device, as set forth in U. S. Reissue Patent No. 22,409 to Joseph Lyman et al., usually exhibits a pronounced tendency to drift toward vibration in a preferred plane, determined by slight ellipticity of its cross-section particularly in the region near the boundary of the supporting base, or by lack of homogeneity of the material, or by a combination of these factors which might also include some effect of motion of the supporting base itself.

Such drift tendencies as outlined above, and as exhibited particularly by cantilever rods, are present, though to a lesser degree, even where the vibratory element is made in extreme proportions of length in relation to diameter, e. g., with a length-to-diameter ratio as great as 10,000, and where the vibratory element is tightly stretched between two points of support, so that tensile forces exerted within the element due to its elongation are predominantly effective in comparison to the bending forces at the junctions of the element with the supporting structure, in their tendency to restore the strand to its neutral position when the middle portion thereof has been transversely displaced. However, where extremely persistent stability characteristics are desired, or where considerable latitude as to proportions and the cross-sectional dimensions and characteristics of the vibratory element are desired, there has been a need for a convenient technique for improvement of the vibration-plane stability of these vibratory elements.

The principal object of the present invention is the provision of improved vibratory stable reference apparatus.

More particularly, it is an object of this invention to provide vibratory reference apparatus wherein the direction of vibration is rendered substantially immune from drift tendencies arising from asymmetry of the vibratory element or support therefor or from any differences of the restraints acting on the vibratory element for different directions of vibration.

In accordance with a principal feature of this invention, the vibratory stable reference apparatus is so arranged that the direction of movement of the vibratory element will always substantially coincide with a significant direction such as the direction of least restraint or the preferred plane thereof.

The preferred plane or direction may be determined by observation of the drift of the direction of vibration of the element during free vibration, following institution of forced vibration thereof in any initial plane. If the plane of instituted vibration is divergent by an angle $\theta$ from the preferred plane, and if the support for the strand remains substantially fixedly oriented in space throughout an appreciable period of time, then the path of movement of a point in the vibratory element will gradually drift from its initial substantially linear movement toward the preferred plane, meanwhile developing into an elliptical locus having an axis coincident with the preferred plane.

The path continues to change in the same direction, until substantially linear movement of the point is again observed, but now at an orientation symmetrically divergent in the opposite sense from the preferred plane. At this significant stage in the progress of the vibratory element, the direction of vibration is at the angle $-\theta$ from the preferred plane. The direction of drift then proceeds through a reversal, the locus again passing through the elliptical stage, back substantially to the plane of initiation of vibration. Upon return to this stage, a drift cycle of the element is completed, and a further drift cycle is commenced, the process being repeated indefinitely. The period of the drift cycle is dependent in inverse relation upon the asymmetry of the element, i. e., upon the ratio of the restraints thereof in the transverse directions of minimum and maximum restraint.

When the preferred plane of vibration as fixed by the characteristics of the element and its support has been ascertained, a further test may be carried out with the initiation of vibration of the element in the preferred plane. For so long thereafter as the space orientation of the vibratory element supporting structure remains fixed, the element will continue to vibrate in the plane of initiation of vibration, being now free from any distraction due to imperfections of the element and its support. With such a test, the preferred plane ascertainment is confirmed.

In the present invention, the supporting structure is constrained to a predetermined space orientation about the axis of the vibratory stable reference element, as for example, an orientation characterized by substantial coincidence of the element vibration plane with the preferred plane of vibration. This may be accomplished by apparatus arranged to control the orientation of the vibratory element supporting structure in such a way as to oppose any tendencies toward divergence of the supporting structure from the predetermined space orientation, according to the plane of vibration of the element.

The invention in another of its aspects relates to novel features of the instrumentalities described herein for achieving the principal objects of the invention and to novel principles employed in those instrumentalities, whether or not these features and principles are used for the said principal objects.

A further object of the invention is to provide improved apparatus and instrumentalities embodying novel features and principles, adapted for use in realizing the above objects and also adapted for use in other fields.

Figure 1B:
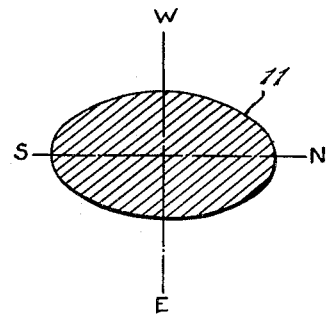
Figure 1:
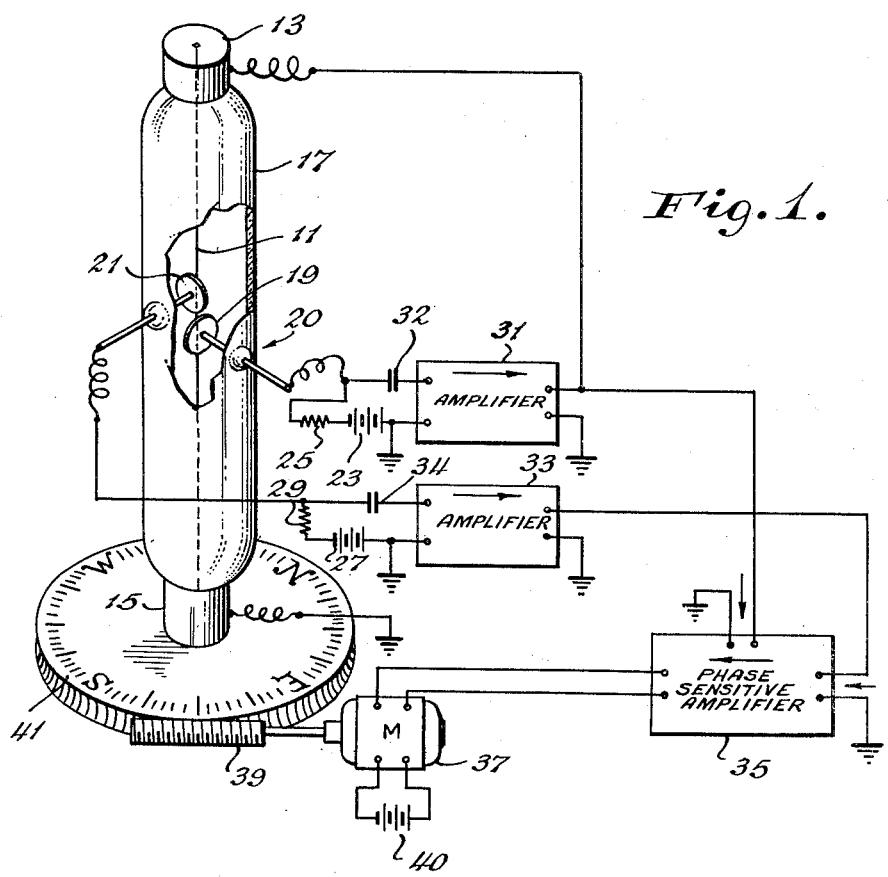
Figure 2:
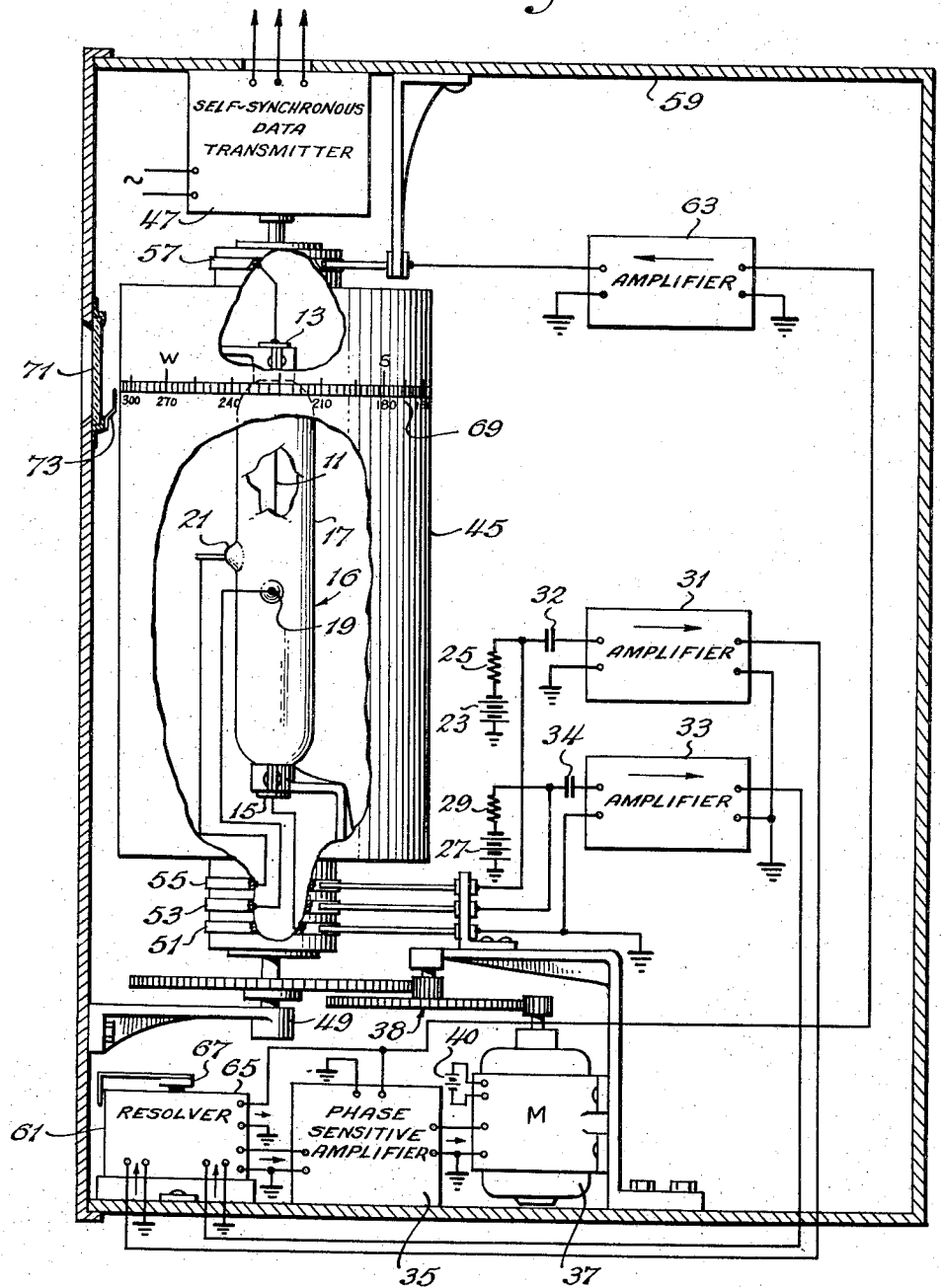

The above objects and features of the present invention will be made more clearly apparent by reference to the following description of an embodiment thereof, wherein Fig. 1 is a diagrammatic view of an embodiment of the present invention, Figs. 1A and 1B are fragmentary views thereof showing exaggerated ellipticity of cross section of the vibratory element therewithin, and Fig. 2 is a complete stable reference instrument embodying the features of the present invention.

Similar reference characters are employed to denote corresponding parts throughout the figures.

Referring now to Fig. 1, there is shown a stabilized compass system including a vibratory strand 11 stretched between two points in metallic ferrules 13 and 15 fitted on the ends of an elongated envelope 17. This envelope may be of vitreous material such as glass or quartz. The strand 11 may be made of a resilient material such as tungsten or platinum or a metal alloy, or it may be formed as a metalized quartz filament. Capacitor pick-off elements 19 and 21 are provided for cooperating with the strand 11 during vibration thereof to generate alternating voltages representing the perpendicular components of vibration of the strand. For this purpose, element 19 is energized by battery 23 through a resistor 25, and capacitor element 21 is similarly energized by a battery 27 through a series resistor 29.

An amplifier 31 having its input circuit coupled to capacitor 19 through a coupling capacitor 32 has a low impedance output circuit connected between the ends of the strand 11. For this purpose, one of the ferrules 15 may be grounded, and the amplifier 31 may have a grounded input terminal and a grounded output terminal. With this arrangement, the amplifier 31 causes alternating current of appreciable amplitude to flow through the strand 11 when this strand vibrates alternately toward and away from capacitor element 19. It will be readily appreciated that this amplified current through strand 11 is of the frequency of the vibration of the strand, and ordinarily will be at the fundamental frequency determined by the tension and mass of the strand 11 and by the distance between the two points of support thereof. When the strand supporting structure is properly oriented relative to the horizontal component of the earth's magnetic field, as will appear below, the alternating current through the strand 11 reacts with the earth's magnetic field to provide vibration sustaining forces at the period of the strand, and thus to retain the strand in vibration across the horizontal component of the earth's magnetic field and, hence, in the east-west vertical plane.

The second capacitor element 21 is coupled through a capacitor 34 to the input terminals of a second amplifier 33, and the output circuit of amplifier 33 is connected to the input terminals of a phase sensitive amplifier 35 arranged to receive a reference phase signal from the output circuit of amplifier 31. The output terminals of the phase sensitive amplifier 35 are connected to control terminals such as field winding terminals of a motor 37 coupled through gear elements 39 and 41 to control the orientation of the strand supporting structure 13, 15, 17. The armature of the motor 37 may be supplied by a power source 40.

When the strand 11 vibrates in a plane perpendicular to the face of capacitor element 19 and parallel to the face of capacitor element 21, the capacitance between this strand 11 and element 21 remains substantially unchanged, and accordingly, no alternating input signal is supplied to amplifier 33. If, however, the structure 20 including parts 11, 13, 15, 17 and 41 turns relative to the plane of vibration of the strand 11, as with the turning in azimuth of a craft upon which the structure 20 is pivoted about a normally vertical axis, an alternating voltage is produced in capacitor plate 21 accordingly as this element departs from parallel relation to the plane of vibration of strand 11. This angular departure signal or error signal is amplified in amplifier 33 and supplied to the phase sensitive amplifier 35, and a suitable voltage is thereupon applied to the field winding terminals of motor 37 for actuating gear element 39 in the direction to hold the structure 20 in fixed spatial orientation. A compass card may be provided in fixed relation to the strand supporting structure, as by a suitable engraving of compass direction designations upon the surface of gear element 41. This compass card or rose is maintained fixed in space about the vertical axis with the east-west axis thereof parallel to the plane of vibration of the strand 11, and hence aligned with the magnetic east-west directions.

If the strand 11 is characterized by such asymmetry of cross section as would determine a preferred plane of vibration thereof parallel to the surface of capacitor 21, and hence, directly toward and away from capacitor 19, then, by virtue of the use of the follow-up system including elements 35, 37 and 39 in conjunction with the structure 20, the strand 11 will always be operated substantially in its preferred plane of vibration. The motor 37 may be arranged to be strongly energized upon a relative departure of a fraction of a degree from parallelism between the face of pick-off element 21 and the plane of vibration of the strand 11, and accordingly, the persistance of operation of the strand 11 substantially in its preferred plane is assured. In this way, the likelihood of coercive effect shifting the vibration path of the strand 11 through an elliptical locus and into a greatly divergent plane of vibration is overcome.

In practice, it is difficult to ascertain in advance what will be the preferred plane of vibration determined by the dimensions and characteristics of the strand and supporting structure, and accordingly, it is not easy to achieve the ideal orientation relation between the capacitor vibration pick-off elements 19 and 21 and the preferred plane E—W as indicated in Figs. 1A and 1B. Structures having the desired characteristics could be obtained by manufacture of a vast number of units and selection of those few units having the desired relations of preferred plane characteristics and pick-off elements, but this would involve a very high percentage of rejections, and an extremely high resultant cost of production. Accordingly, in a preferred form of the present invention, as illustrated in Fig. 2, means may be provided for use of any vibratory strand support, irrespective of angular relation between the preferred plane of vibration and the directions of insertion of the pick-off elements, in such a way that the strand is maintained in vibration in a plane substantially coincident with its preferred plane of vibration.

The strand supporting unit 16 including strand 11, ferrules 13 and 15 and envelope 17 is shown mounted within a cylindrical shell 45 which may be constructed of plastic material, for example. Shell 45 is attached at its upper end to the rotor of a self-synchronous data transmitter 47, and it is pivotally supported at its lower end in a journal 49. Slip rings 51, 53, 55 and 57 are provided on the shell 45, and suitable brushes are arranged for cooperating with these slip rings to permit the maintenance of electric circuit connections between the unit 16 and external electric circuit elements, while permitting relative rotation between the shell 45 and the housing 59 of the stable reference instrument.

Through slip rings 51, 53, and 55, the capacitor elements 19 and 21 are coupled as before to the input circuits of amplifiers 31 and 33; but the output circuits of these amplifiers are connected to the dual input circuits of a component transformation device or "resolver" 61, such as the "resolver," catalogue No. AY-131, manufactured by Pioneer Instrument Co. One output circuit of the "resolver" 61 is connected to the principal input circuit of the phase sensitive amplifier 35, while the other output circuit of the "resolver" 61 is connected to the phase reference circuit of phase sensitive amplifier 35 and, through a further amplifier 63 and slip ring 57, to the ferrule 13 at the top of the strand, for providing alternating driving current through the vibratory strand 11.

As before, the output circuit of the phase sensitive amplifier 35 is connected to the control circuit terminals of a motor 37 having its armature supplied by a source 40, and the motor 37 is coupled, as by a gear-train 38, to the shell 45 for providing relative rotation between the shell 45 and the housing 59 according to the output voltage of the phase sensitive amplifier 35.

The "resolver" 61 includes a pair of mutually perpendicular input coils arranged for freedom from mutual coupling, and a pair of mutually perpendicular output coils similarly isolated with respect to each other. One pair of coils is fixed to the stationary portion 65 of the "resolver," while the other pair is fixed to the rotor 67. The rotor 67 of the "resolver" may be turned to any desired position for effectively rotating the pick-off elements 19 and 21 relative to the unit 16.

With the vibratory stable reference system illustrated in Fig. 2, the preferred plane of vibration of the strand 11 may be determined in the manner generally outlined above, and thereafter, the rotor 67 of the resolver 61 may be turned as required to provide for zero input signal supplied to the principal input circuit of the phase sensitive amplifier 35 when the stand 11 vibrates in the preferred plane. Thereafter, the rotor 67 of the "resolver" is retained fixedly positioned, since the characteristics of the unit 16 as to its preferred plane are substantially permanent.

A compass calibration scale 69 may be provided upon the outer surface of the cylindrical shell 45, and window 71 and a pointer or index 73 may be provided in the housing 59 to facilitate visual reference to the shell 45. Furthermore, if desired, the self-synchronoous data transmitter 47 may be connected to remote indicators or to the azimuth reference input circuit of an automatic pilot, for supplying thereto data signals accurately indicating variations of the heading of the craft in which the instrument shown in Fig. 2 is installed.

Not only does the follow-up system including the phase sensitive amplifier 35 and the motor 37 coupled to the shell 45 act to retain the unit 16 oriented for preferred plane operation and hence, maximum stability of vibration of vibratory element or strand 11; but also, this follow-up system provides a simple and efficient arrangement for indicating directly the orientation of the plane of vibration of element 11, and for actuating remote indicators or other devices without reflecting adverse loading effects or error producing coercion upon the vibratory element 11.

While the present invention has been illustrated as applied to tightly stretched strands employed as the vibratory element, it will be readily apparent that the principles of follow-up drive for preferred-plane operation are readily usable with vibratory elements of other types. It is with the stretched strands, however, that extremely high accuracy is most readily achieved with the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stable reference apparatus comprising a supporting structure, a strand attached thereto at two widely separated points and stretched between said points for periodic vibration in a plane containing said two points at a resonant frequency determined by its mass and tension, means responsive to movement of a portion of said strand perpendicular to its length for exerting alternating forces on said strand to sustain vibration thereof, whereby said strand is caused to vibrate at its resonant frequency in a plane passing through said points, and means for controlling the orientation of said supporting structure according to the plane of vibration of said strand, said last named means comprising means for detecting relative angular displacement between a selected plane in said supporting structure and the plane of vibration of said strand and for exerting a torque on said supporting structure about said axis to retain said supporting structure in predetermined alignment with said plane of vibration.

2. Stable reference apparatus comprising a base, a strand supporting structure pivotally supported thereby for rotation about a predetermined axis, a strand attached to said supporting structure at two widely separated points and stretched between said points for periodic vibration in a plane passing through said two points at a resonant frequency determined by its mass and tension, said two points being aligned substantially parallel to said axis, means responsive to movement of said strand in a plane through said two points for exerting alternating forces on said strands to sustain vibration thereof, whereby said strand is caused to vibrate at its resonant frequency in a plane passing through said two points, and means for controlling the orientation of said supporting structure according to the plane of vibration of said strand, said last named means comprising means responsive to relative angular displacement between a selected plane in said supporting structure and the plane of vibration of said strand for producing relative movement between said supporting structure and said base in the direction and to the extent to suppress said relative displacement.

3. Stable reference apparatus as defined in claim 2, wherein said predetermined axis is substantially vertical, and said means for exerting alternating forces on said strand comprises means for passing alternating currrent through said strand between said two points for producing alternating force reactions with the earth's magnetic field, whereby said strand is caused to vibrate in the east-west vertical plane and said supporting structure is accordingly held in substantially fixed azimuthal orientation in predetermined relation to the earth's magnetic field.

4. Stable reference apparatus as defined in claim 2, wherein said means for exerting alternating forces on said strand comprises means for passing alternating current through said wire between said two points for producing alternating force reactions with an ambient magnetic field.

5. A stable reference apparatus comprising a supporting structure, an elongated, wire-like element supported at its ends in a manner to permit free vibration thereof, means including pick-off means on said supporting structure lying in the normal plane of vibration of said element and responsive to vibration thereof for supplying to said element a periodically varying current having a periodicity corresponding to the natural period of said element, whereby said current will react with the earth's field to cause said element to vibrate in a plane normal to the direction of the component of said field lying perpendicular to said element, vibration responsive means on said support disposed at right angles to said plane for providing a signal proportional to the deviation between said plane and a plane in said supporting structure normally aligned therewith, and means responsive to said signal for restoring said supporting structure to the position of alignment between said planes.

6. A stable reference of the character described comprising a support, an elongated, wire-like element supported at its ends on said support in a manner to permit free vibration thereof, means including first pick-off means on said support and in alignment with the normal plane of vibration of said element for generating an alternating current having a frequency corresponding to the natural frequency of vibration of said element, means for supplying said alternating current to said element whereby said alternating current will react with the earth's field to cause said element to vibrate in a plane normal to the direction of the component of said field lying perpendicular to said element, second pick-off means on said support disposed in a plane perpendicular to said normal vibration plane for providing a signal proportional to the deviation between said plane and a plane in said support normally aligned therewith, and a signal responsive means connected with said pick-off for rotating said support to the position of alignment between said planes.

7. A stable reference of the character described comprising a support, an elongated, wire-like element supported at its ends on said support in a manner to permit free vibration thereof, means including a first capacitive pick-off disposed on said support in alignment with the normal plane of vibration of said element for producing a periodically varying current having a periodicity corresponding to the natural period of vibration of said element, means for supplying said current to said element whereby said alternating current will react with the earth's field to cause said element to vibrate in a plane normal to the direction of the component of said field lying perpendicular to said element, a second capacitive pick-off disposed on said support at right angles to said first pick-off for producing a periodicity varying current of phase and amplitude corresponding to the angular deviation between said plane of vibration and a plane in said support defined by said first pick-off and normally aligned therewith, and phase responsive motive means connected with said second pick-off for rotating said supporting structure to a position of alignment between said planes.

8. A stable reference apparatus comprising a rotatable supporting structure, an elongated, wire-like element supported at its ends on said structure in a manner to permit free vibration thereof, means for supplying to said element an alternating current having a frequency corresponding to the natural frequency of vibration of said element, whereby said current will react with the earth's field to cause said element to vibrate in a plane normal to the direction of the component of the earth's field lying perpendicular to said element, pick-off means on said structure for determining the direction of vibration of said element when said supporting structure is rotated, and follow-up motive means actuated from said pick-off means for maintaining said structure in a selected relation to said direction of vibration.

9. A stable reference apparatus of the character described comprising a support, an elongated, wire-like element supported at its ends in a manner to permit free vibration thereof, driving means for said element comprising means responsive to the vibration of said element and positioned in the plane of normal vibration thereof for producing an alternating current having a frequency determined by the natural frequency of vibration of said element, and means for supplying said alternating current to said element whereby said alternating current will react with the earth's field to cause said element to vibrate in a plane normal to the direction of the component of said field lying perpendicular to said element, means disposed on said support perpendicular to said vibration responsive means for detecting a component of vibration of said element which is perpendicular to the normal plane of vibration of said element, and means responsive to said last-mentioned means for rotating said support means to reduce said perpendicular component of vibration to zero.

10. A stable reference apparatus comprising a supporting structure, an elongated, wire-like element supported at its ends in a manner to permit free vibration thereof, first pick-off means on said supporting structure lying in the normal plane of vibration of said element and responsive to vibration thereof for deriving an alternating current signal having a frequency corresponding to the natural frequency of vibration of said element, amplifier means having an input thereof connected to receive said signal and an output connected to said element for supplying thereto an alternating current having a frequency corresponding to the natural frequency of vibration of said element, whereby the alternating current supplied to said element will react with the component of the earth's field which lies perpendicular to the vibration axis of said element to cause said element to vibrate in a plane normal to the direction of said earth's field component, second pick-off means on said support disposed at right angles to said first pick-off means for providing a signal proportional to the deviation between said plane and a plane in said supporting structure normally aligned therewith, amplifier means having an input thereof connected to receive said deviation signal and an output, a phase-sensitive amplifier having inputs connected to receive the outputs of said last-mentioned amplifier means and said first-mentioned amplifier means and an output, motive means having a control winding connected to the output of said phase-sensitive amplifier for rotating said supporting structure to a position of alignment between said vibration plane and the plane in said supporting structure normally aligned therewith.

11. A vibratory stable reference apparatus of the character described comprising a support, an elongated, wire-like element supported at its ends in a manner to permit free vibration thereof, signal controlled means for supplying a periodically varying current to said element having a periodicity corresponding to the natural period of said element, whereby said element will vibrate in a natural vibration plane dependent upon its physical characteristics when the current therein reacts with the component of the earth's field which lies perpendicular to the vibration axis of said element, signal controlled motive means connected to rotate said support about said vibration axis, a pair of pick-offs disposed on said support to provide signals respectively dependent upon relatively angularly disposed components of vibration of the wire, and resolver means for supplying said signals to each of said signal controlled means.

12. A vibratory stable reference apparatus of the character described comprising a support, an elongated, wire-like element supported at its ends in a manner to permit free vibration thereof, signal controlled means for supplying a periodically varying current to said element having a periodicity corresponding to the natural period of said element, whereby said element will vibrate in a natural vibration plane dependent upon its physical characteristics when the current therein reacts with the component of the earth's field which lies perpendicular to the vibration axis of said element, signal controlled motive means connected to rotate said support about said vibration axis, a pair of pick-offs perpendicularly disposed on said support to provide signals respectively dependent upon perpendicularly disposed components of vibration of the wire, and resolver means for supplying said signals to each of said signal controlled means.

13. A vibratory stable reference apparatus of the character described comprising a support, an elongated, wire-like element supported at its ends in a manner to permit free vibration thereof, signal controlled means for supplying a periodically varying current to said element having a periodicity corresponding to the natural period of said element, whereby said element will vibrate in a natural vibration plane dependent upon its physical characteristics when the current therein reacts with the component of the earth's field which lies perpendicular to the vibration axis of said element, signal controlled motive means connected to rotate said support about said vibration axis, a pair of pick-offs perpendicularly disposed on said support to provide signals respectively dependent upon perpendicularly disposed components of vibration of the wire, and resolver means for supplying said signals to each of said signal control means, and means for adjusting said resolver means to provide zero signal input to said signal controlled motive means when said element vibrates in its natural vibration plane relative to said earth's field component.

ARTHUR L. RAWLINGS.

REFERENCES CITED

The following references are of record in the file of this patent:

UNITED STATES PATENTS

| Number | Name | Date |
| --- | --- | --- |
| Re. 22,409 | Lyman et al. | Dec. 21, 1943 |
| 2,308,566 | Noxon | Jan. 19, 1943 |
| 2,331,617 | Moore | Oct. 12, 1943 |
| 2,376,883 | Riggs et al. | May 29, 1945 |
| 2,383,459 | Beach | Aug. 28, 1945 |
| 2,434,324 | Lehde | Jan. 13, 1948 |